(12) United States Patent
McDonald et al.

(10) Patent No.: US 11,937,361 B1
(45) Date of Patent: Mar. 19, 2024

(54) ANNULAR HOLLOW CATHODE

(71) Applicant: The Government of the United States of America, as represented by the Secretary of the Navy, Arlington, VA (US)

(72) Inventors: Michael McDonald, Springfield, VA (US); Marcel Georgin, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 117 days.

(21) Appl. No.: 17/668,344

(22) Filed: Feb. 9, 2022

Related U.S. Application Data

(60) Provisional application No. 63/148,199, filed on Feb. 11, 2021.

(51) Int. Cl.
*H05H 1/48* (2006.01)
*B64G 1/40* (2006.01)
*H05H 1/34* (2006.01)

(52) U.S. Cl.
CPC .......... *H05H 1/481* (2021.05); *H05H 1/3442* (2021.05); *B64G 1/405* (2013.01)

(58) Field of Classification Search
CPC ............. H05G 2/003; H05H 1/04; H01S 4/00
See application file for complete search history.

(56) References Cited

U.S. PATENT DOCUMENTS

| 4,663,567 A | * | 5/1987 | Wong | ..................... H05G 2/003 |
| | | | | 315/111.41 |
| 2007/0181417 A1 | * | 8/2007 | Chistyakov | ......... C23C 14/3414 |
| | | | | 204/192.1 |
| 2012/0143184 A1 | * | 6/2012 | Suslov | ..................... H05H 1/34 |
| | | | | 606/49 |

* cited by examiner

*Primary Examiner* — Thien S Tran
(74) *Attorney, Agent, or Firm* — US Naval Research Laboratory; Jorie L. Stroup

(57) ABSTRACT

A cathode emitter assembly includes a cathode tube having a gas feed portion and a plasma outflow portion; an outer annular cathode insert in the plasma outflow portion of the cathode tube; an inner cathode insert in the plasma outflow section of the cathode tube; and an annular plasma emission portion defined between an inner surface of the outer annular cathode insert and an outer surface of the inner cathode insert.

20 Claims, 4 Drawing Sheets

ANNULAR HOLLOW CATHODE

RELATED APPLICATIONS

This application claims the benefit of U.S. Provisional Application No. 63/148,199 filed Feb. 11, 2021, which is hereby incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 210157.

FIELD OF INVENTION

The present invention relates generally to low temperature plasma sources, and more particularly to a plasma source used as a cathode for electron extraction having an annular cross-sectional emission area.

BACKGROUND

Thermionic hollow cathodes are low temperature plasma sources with many applications. One application is to supply discharge current and neutralize ion beams in plasma propulsion devices such as Hall and ion thrusters. The cathode functions by heating a specially chosen material, the thermionic electron emitter, to temperatures sufficient to essentially "boil" off electrons into free space. Cathode ignition typically occurs after the thermionic emitter has been preheated to high temperatures of several 100s to low 1000s Celsius, supplied with a gas flow, and subjected to high voltage from a nearby auxiliary electrode called the cathode keeper, which electrically breaks down the gas between the thermionic insert and keeper and subsequently supplies enough electrical current to "keep" the cathode lit. Gas flows down a supply tube, through an often tubular thermionic insert (see FIG. 1), and electrons are then extracted through one or more orifices in the keeper where they become available for subsequent ignition of the full thruster system.

The current capacity from a hollow cathode is highly dependent on several factors, such as total surface area, the neutral gas pressure profile, and plasma processes that determine the emitter temperature. Since the amount of current that can be extracted by the emitter is a strong nonlinear function of its temperature and linearly proportional to its surface area, and because operating power increases and emitter lifetime decreases with temperature, it is generally desirable to increase the surface area of the thermionic emitter as much as reasonable to achieve a target current at a lower temperature within a cathode's permitted size, as constrained by the rest of the system in which it will be used. However, with increasing cathode size, i.e., diameter, a greater amount of gas must be provided to maintain the internal pressure against the flow departing the cathode orifice. Ideally one would like to produce a given current using as little power (thus, voltage) and propellant (thus, gas mass flow rate) as possible. However, when too much current is drawn at a given mass flow the plasma tends to form instabilities that both increase the discharge voltage (hurting electrical efficiency) and drive energetic ion erosion of the cathode surfaces (hurting lifetime).

Earlier work has attempted to shift this transition from stable to unstable operation by introducing a multiple orifice keeper design that preferentially blocks the neutral gas flow out of the system, reducing the required flow to sustain a desired internal pressure, as well as forces the plasma and exiting neutral gas off-axis. From this earlier work, it was found that increasing the spread of the plasma using a multiple orifice keeper tended to promote a more stable cathode discharge with lower amplitude oscillations in the discharge current.

SUMMARY OF INVENTION

However, the multiple orifice keeper presents additional design risk as well. There is an increased risk of short circuits formed between the cathode and the keeper because the multiple orifice keeper blocks more of the gas flow leaving the device, allowing debris to build up on the rear or internal face of the keeper and accrue until it can flake off or directly bridge the cathode-keeper gap. This tendency is exacerbated by the neutral- and plasma-diverting function of the multiple orifice keeper. Redirecting the neutral flow increases the internal gas pressure, making the plasma more collisional and thus heating the plasma electron temperature inside the cathode. This in turn drives more energetic ion bombardment and increased erosion and re-deposition in the internal region. It would be desirable to achieve the plasma and neutral gas spreading features of the multiple orifice keeper without forming a hot collisional plasma over electrode surfaces prone to sputtering and electrical shorting.

Therefore, presented herein is an invention, embodiments of which may be designed to spread electron current emitted from a hollow cathode over a larger exiting area than in a standard tubular design by forming the plasma in an annulus before discharging it from the cathode. Spreading out the plasma reduces the formation of instabilities in the plasma, increasing cathode efficiency and lifetime. The annular design spreads the current without requiring an external obstructing surface such as a hollow cathode keeper (or multiple orifice keeper) to redirect the plasma, preventing energy loss by plasma impingement on the external surface. It also increases the cathode emission area achievable within a given cathode size, allowing reduced cathode operating temperature and thus extending cathode lifetime at a given current, or allowing a larger current at the same temperature. Finally, it slows neutral gas velocity, increasing residence time for gas utilization.

According to an aspect of the invention, a cathode emitter assembly includes a cathode tube having a gas feed portion and a plasma outflow portion; an outer annular cathode insert in the plasma outflow portion of the cathode tube; an inner cathode insert in the plasma outflow portion of the cathode tube; and an annular plasma emission portion defined between an inner surface of the outer annular cathode insert and an outer surface of the inner cathode insert.

Optionally, at least one of the cathode inserts comprises an emissive material.

Optionally, both of the cathode inserts comprise emissive material.

Optionally, the cathode emitter assembly includes a second inner cathode insert in the outflow section of the cathode tube, and wherein the annular plasma emission portion is defined between the inner surface of the outer annular cathode insert and outer surfaces of both of the inner cathode inserts.

Optionally, the cathode emitter assembly includes an intermediate annular cathode insert in the plasma outflow section of the cathode tube, and wherein the annular plasma emission portion has an outer portion and an inner portion, the outer portion being defined between the inner surface of the outer annular cathode and an outer surface of the intermediate annular cathode insert and the inner portion being defined between an inner surface of the intermediate annular cathode insert and the outer surface of the inner cathode insert.

Optionally, the cathode emitter assembly includes a plurality of intermediate cathode inserts in the outflow section of the cathode tube, and wherein the annular plasma emission portion has a plurality of annular plasma emission portions, and wherein an outermost annular plasma emission portion is defined between the inner surface of the outer annular cathode insert and an outer surface of an adjacent intermediate cathode insert, one or more intermediate plasma emission portions are defined between opposing surfaces of adjacent intermediate annular cathode inserts, and an innermost annular plasma emission portion is defined between an inner surface of an innermost intermediate cathode insert and the outer surface of the inner cathode insert.

Optionally, radii of the inner and outer emitters are sized from an existing cathode with conventional tubular emitter using a method of equal pressure drop across an annular emitter length as compared to the conventional tubular emitter Optionally, the inner and outer emitting surfaces are physically connected, and are configured to permit gas to flow through one or more regions between the inner and outer emitting surfaces.

Optionally, the inner and outer emitting surfaces comprise a monolithic structure, and are configured to permit gas to flow through one or more regions between the inner and outer emitting surfaces.

The foregoing and other features of the invention are hereinafter described in greater detail with reference to the accompanying drawings.

DETAILED DESCRIPTION

It is desirable for efficient cathode operation to 1) increase the surface area of the emitter, 2) reduce the required gas flow to ignite and sustain the hollow cathode, 3) spread out the plasma as much as possible, 4) provide a low resistance path for electron extraction, and 5) to do so in a compact package as the hot cathode radiates energy and a smaller device is easier to heat shield. These objectives can be achieved by using an annular emitter geometry in a hollow cathode.

Figure 1:
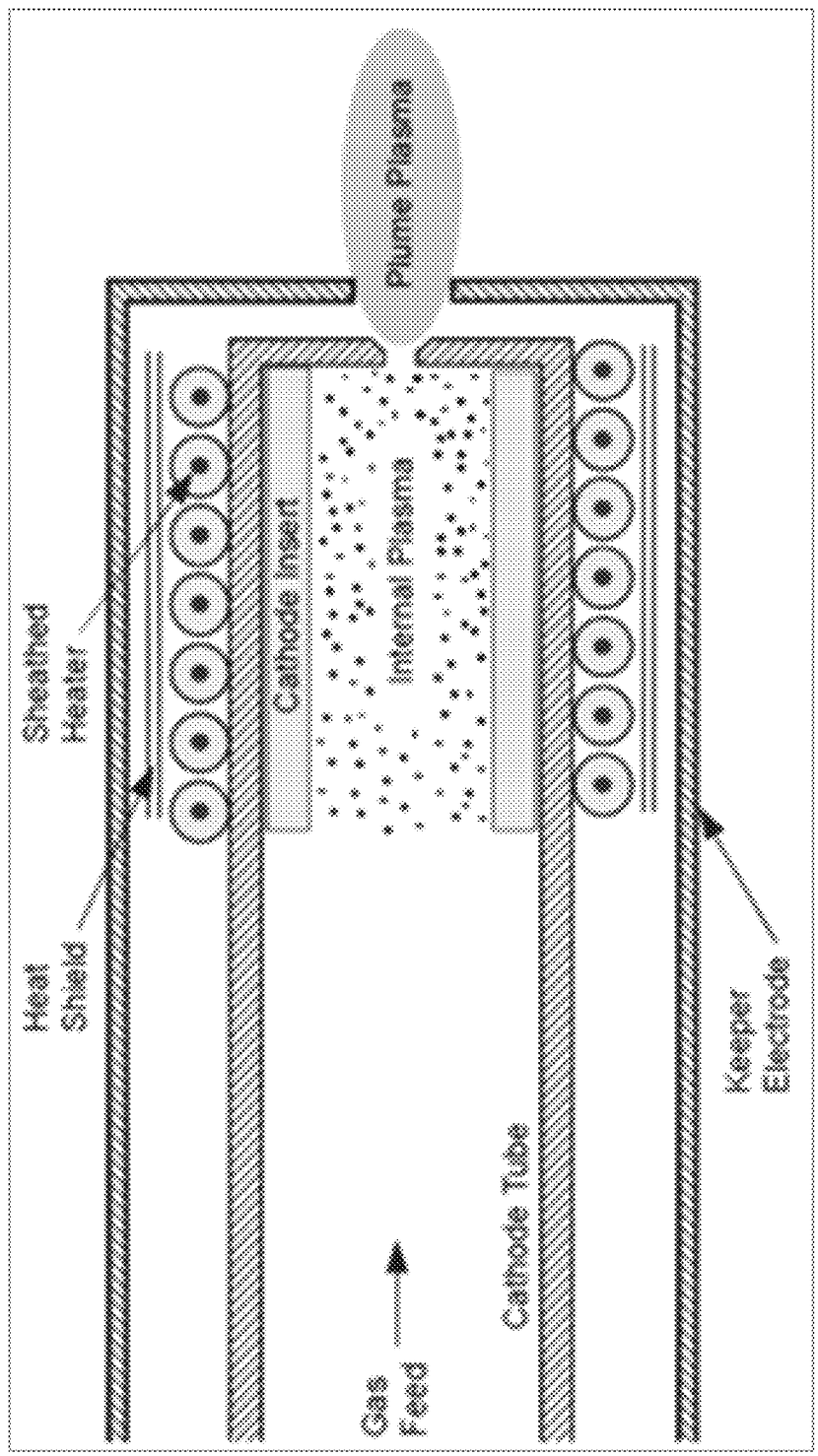
FIG. 1 shows a diagram of a conventional hollow cathode. A 2D cross-section of the hot tip of the cathode showing typical placement of the concentric cathode tube and keeper electrode, with gas source and plasma emission labeled.
Figure 2:
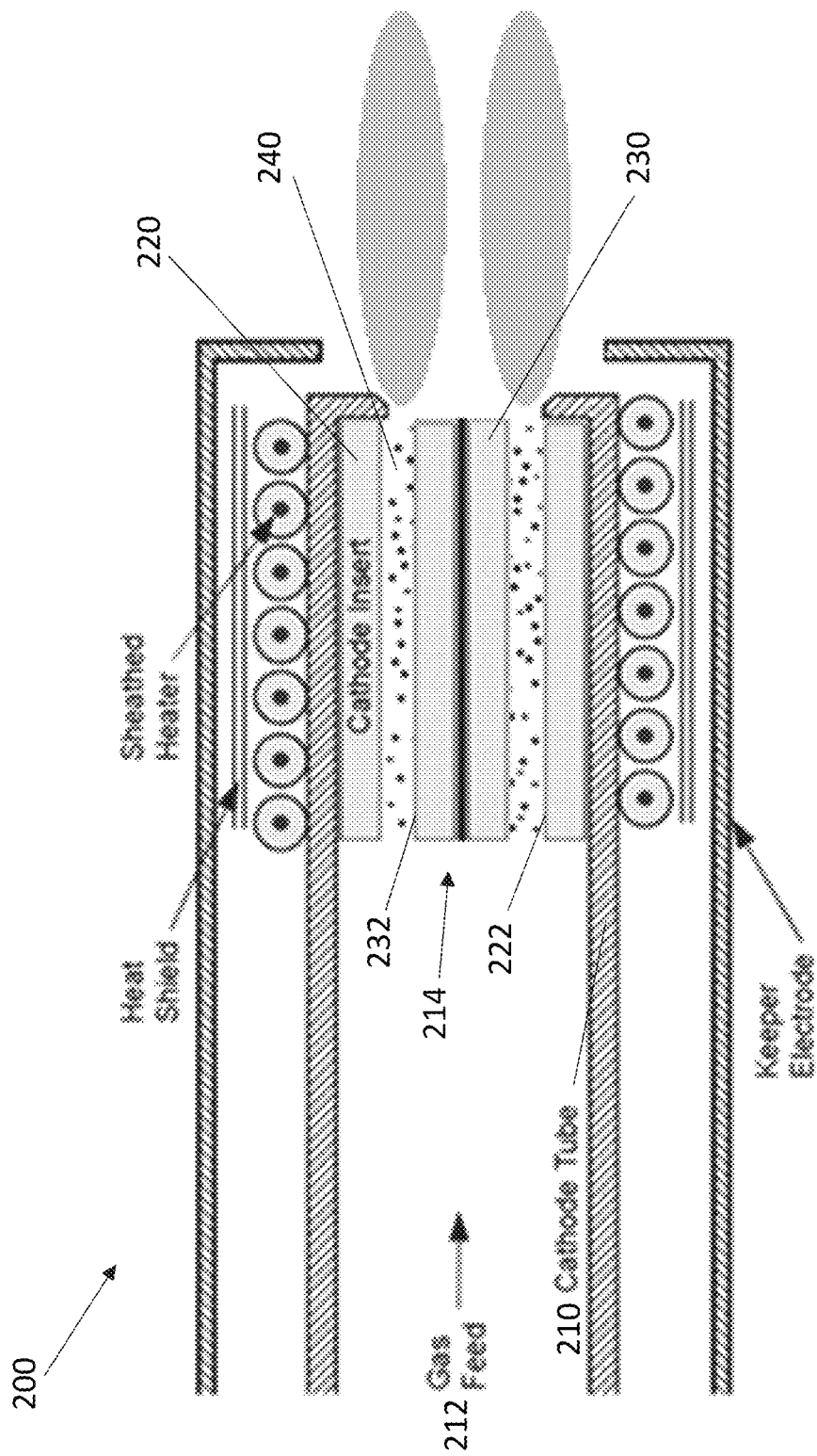
FIG. 2 shows a diagram of an exemplary hollow cathode with an annular emission area.

Exemplary embodiments adapt the typical tubular emitter geometry of the hollow cathode (see FIG. 1) into an annular, or concentric geometry by placing additional emitter material on axis (see FIG. 2). A cathode emitter assembly 200 includes a cathode tube 210 having a gas feed portion 212 and a plasma outflow portion 214. An outer annular cathode insert 220 is positioned in the plasma outflow portion 214 of the cathode tube 210. An inner cathode insert 230 is positioned in the plasma outflow portion 214 of the cathode tube 210. An annular plasma emission portion 240 is defined between an inner surface 222 of the outer annular cathode insert 220 and an outer surface 232 of the inner cathode insert 230.

Figure 3:
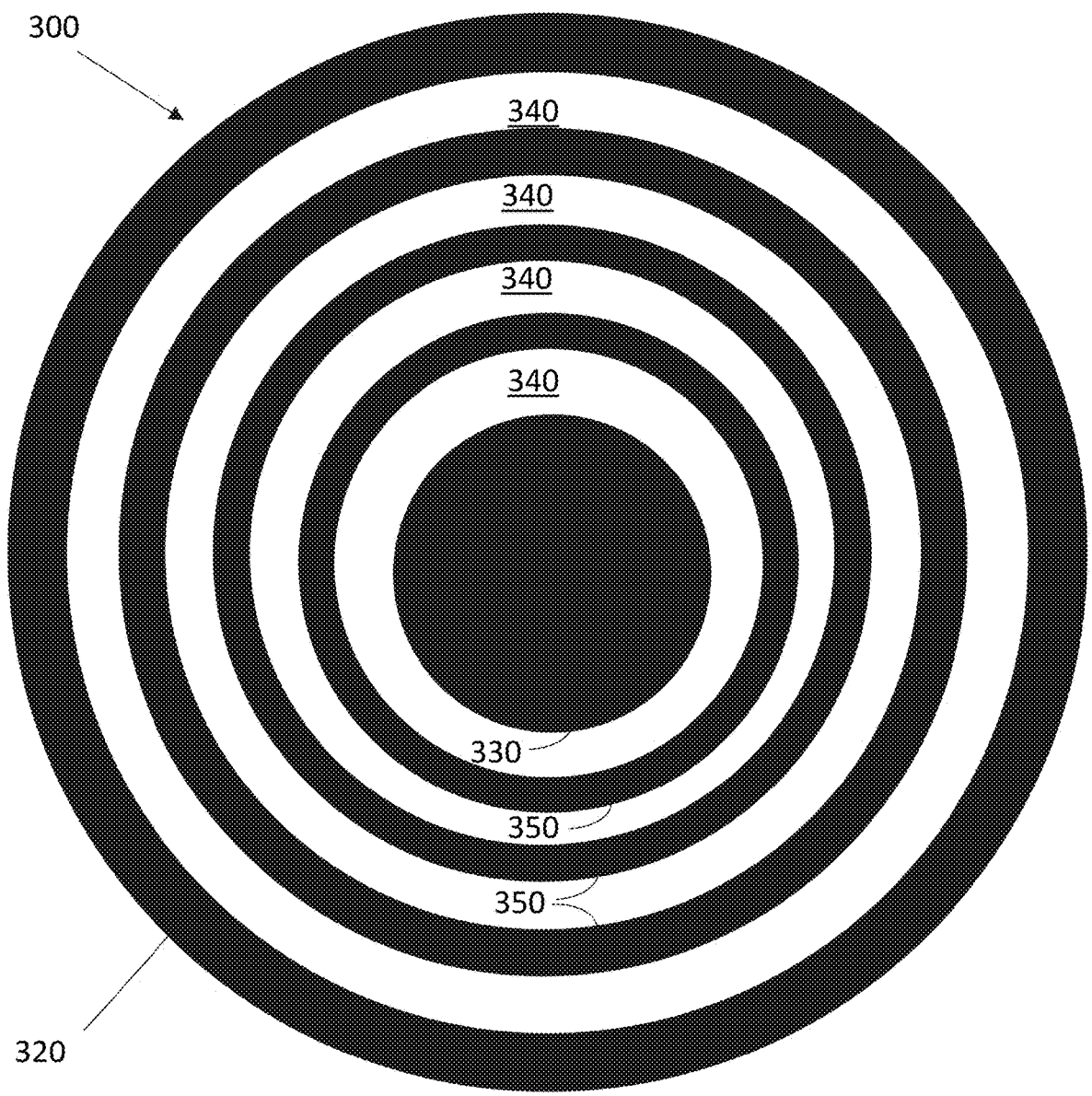
FIG. 3 shows a schematic cross-sectional view of an exemplary hollow cathode with nested intermediate inserts.

Turning now to FIG. 3, an alternative exemplary embodiment is shown in schematic form, omitting exterior structures and showing merely the insert portions of the cathode. FIG. 3 depicts a plurality of intermediate cathode inserts 350 in the outflow section of the cathode tube (although any number of intermediate cathodes may be present, including only 1 such cathode) in addition to an outer 320 and inner 330 insert. Exemplary embodiments of this type have a plurality of annular plasma emission portions 340. The annular plasma emission portions are defined between opposing surfaces of adjacent cathode inserts.

Figure 4:
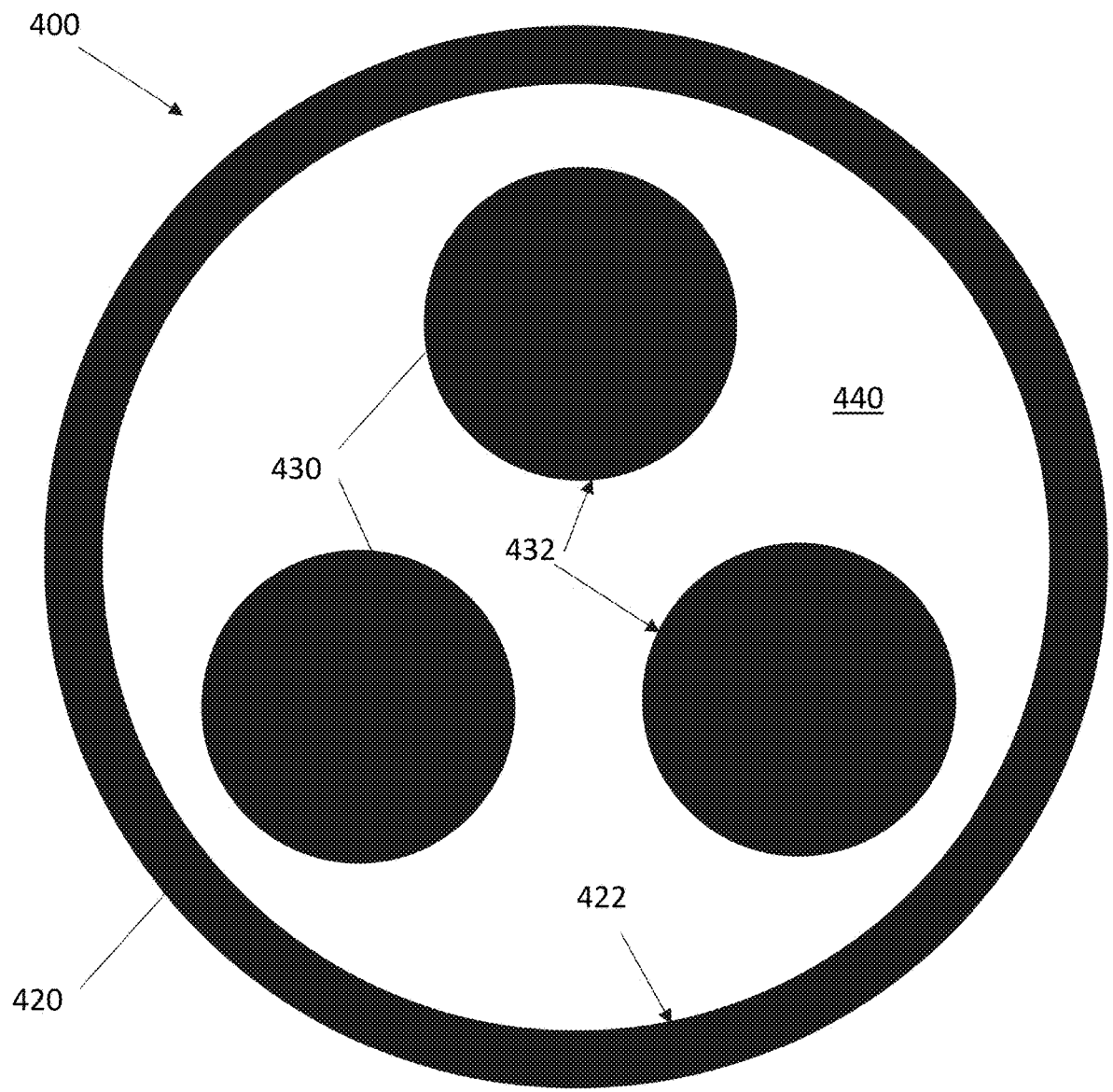
FIG. 4 shows a schematic cross-sectional view of an exemplary hollow cathode with multiple inserts.

Turning now to FIG. 4, an alternative exemplary embodiment is shown in schematic form, omitting exterior structures and showing merely the insert portions of the cathode. FIG. 4 depicts a cathode assembly 400 having multiple inner cathode inserts 430 which would be positioned in the outflow section of a cathode tube. The annular plasma emission portion 440 is defined between the inner surface 422 of the outer annular cathode insert 420 and outer surfaces 432 of the inner cathode inserts 430.

Consider the internal surface area $A_{tube}$ of a typical tubular emitter with circular cross section of radius $r_0$ and length L such that $A_{tube}=2*pi*r_0*L$. If we replace this emitter with an emitter of annular cross section with outer radius a and inner radius b, the total surface area of the outer emitter is $2\pi aL$ and the total surface area of the inner emitter is $2\pi bL$. The surface area improvement is then $A_{annular}/A_{tube}=(a+b)/r_0$, or expressed in terms of the gap between emitters delta=$(a-b)/r_0$, $A_{annular}/A_{tube}$=delta+$2*b/r_0$. For the simple case where additional emitter material is placed on the axis of an existing circular cross section emitter such that a=$r_0$ we find $A_{annular}/A_{tube}$=2-delta. Since we require b<a (or equivalently, delta>0) for any gap to exist, the limit of area increase in this case is a factor of two. Alternatively, instead of increasing the area, for a fixed current requirement from the cathode the emitter length can be reduced. This is useful to reduce heating power requirements for the cathode.

In addition to improving the scaling of the total current, there exist analytical scaling laws for pressure drop making reasonable assumptions of Poiseuille flow that connect the standard tube configuration to the new annular design. For a tubular design with radius and fixed volumetric flow rate, the ratio of the change in pressure is given by $$\frac{\Delta P_{tube}}{\Delta P_{annular}} = \frac{\left(\frac{r_0}{b}\right)^4}{\left(\frac{a}{b}\right)^4 - 1 - \frac{\left(\left(\frac{a}{b}\right)^2 - 1\right)^2}{\ln\left(\frac{a}{b}\right)}}, \quad (1)$$

Therefore, given a standard hollow cathode tube design with known $r_0$ and $\Delta P_{tube}$, one can devise a similar annular cathode configuration by choosing any one of the desired inner emitter radius, desired change in pressure $\Delta P_{annular}$, ratio of a/b or gap spacing delta. Similarly, there also exists an expression for the flow velocity:

$$\frac{u_{tube}}{u_{annular}} = \frac{(r_0^2 - r^2)/b^2}{1 - \left(\frac{r}{b}\right)^2 + \left(\left(\frac{a}{b}\right)^2 - 1\right)\frac{\ln\left(\frac{r}{b}\right)}{\ln\left(\frac{a}{b}\right)}}. \quad (2)$$

When the ratio a/b is greater than 1, then the velocity of the gas down the tube has decreased.

Using these scaling laws, an exemplary annular hollow cathode may be based, for example, on an existing tubular cathode. In this example, the pressure drop matches that of the conventional existing cathode (for a fixed gas flow rate) and a convenient inner annulus radius $b=r_0$ may be used in the exemplary design. From Eqn. (1) it follows that b/a=1.8, producing an increase in surface area and decrease in the mean flow velocity by the same factor 1+b/a=2.8.

This technique may naturally be applied to reduce the temperature and thus power consumption of a cathode operating at a given current, increase the current available at a given operating temperature, or reduce the size of a cathode operating at a given current.

Embodiments of the invention naturally spread out the plasma by moving plasma production off axis, which is correlated with improved cathode performance due to reduced plasma instability.

Exemplary embodiments also reduce gas flow velocity while maintaining pressure profile, increasing neutral residence time in cathode for better gas utilization efficiency. Exemplary embodiments have an increased cross-sectional exit plane area with same pressure gradient and total mass flow rate due to reduced velocity, enabling 1) reduced insert exit plane current density when operating at same total current as a conventional design, and 2) increased total current at matched exit plane current density as a conventional design.

Exemplary embodiments have an increased electron emission area packed into the same volume as a conventional design, permitting a more compact electron emission source of comparable total current capacity.

Exemplary embodiments also have backwards compatibility with conventional cathode design envelopes. This type of design can be retrofit onto existing cathode and keeper designs, providing a route to delta qualification and comparison of performance benefits with the existing design.

Exemplary embodiments are compatible with other recently invented techniques:
  Intricate internal keeper geometries attainable by 3D printing for radiation shielding.
  Altered keeper orifice geometry using multiple orifice or non-circular orifice keepers.

The exemplary embodiments described above include a single annulus comprising two emitting surfaces. The same principles would apply to a plurality of nested emitting surfaces, for example two annuli comprising an outermost emitting surface facing inward, an innermost emitting surface facing outward, and intermediate surface(s) oriented appropriately forming concentric rings.

Exemplary embodiments include a circular ring or annulus for ease of fabrication but any form topologically the same as a ring (i.e., stretchable into a ring shape) such as a square or oval ring would perform similarly, and "annular" as used herein refers to topology and should not be understood to refer only to circular cross-sectional shapes.

The inner and outer annulus surfaces of the cathode need not be identical, or even both be emissive. Either the inner or the outer surface of the annulus might be replaced by a non-emitting thermionic material such as graphite, or by a different type of emitting material such as lanthanum hexaboride, barium oxide impregnated tungsten, carbon nanotubes, or others. For example, an exemplary cathode assembly may include a conventional circular tube hollow cathode with a plain graphite rod inserted on axis into the tube, as it may provide several plasma spreading and velocity-reducing benefits even without the increase in emission area.

An annulus may be formed for only part of the length of an emitter instead of its full length. For example, a solid cylinder of emitter material may have an annulus bored into one half of its length, with slots milled into the other half to allow gas to pass through to the annular portion, enabling a single emitter of complicated shape to achieve the benefits of an annular emitter. In general we have shown a particular manner of mounting the central portion of the annulus in our diagrams, but this is not intended to be an exclusive configuration.

Exemplary annular designs can be combined with other state-of-the-art methods, including the multiple orifice keeper or a keeper with integrated radiation shielding.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A cathode emitter assembly including:
   a cathode tube having a gas feed portion configured to receive a gas and a plasma outflow portion configured to discharge plasma;
   at least one cathode insert in the plasma outflow portion of the cathode tube; and
   at least one plasma emission channel extending about the at least one cathode insert within the cathode tube; wherein the cathode emitter assembly is configured to form the plasma within the at least one plasma emission channel such that gas enters a first end of the at least one plasma emission channel and plasma exits a second end of the at least one plasma emission channel.
2. The cathode emitter assembly of claim 1, wherein the at least one cathode insert comprises an emissive material.
3. The cathode emitter assembly of claim 1, wherein the at least one cathode insert comprises a non-emissive material.

4. The cathode emitter assembly of claim 1, wherein the at least one cathode insert comprises an outer cathode insert, a first inner cathode insert, and a second inner cathode insert in the outflow section of the cathode tube, and
wherein the at least one plasma emission channel is defined between an inner surface of the outer cathode insert and respective outer surfaces of the first and the second inner cathode inserts.

5. The cathode emitter assembly of claim 1, wherein the at least one cathode insert comprises and outer cathode insert, an inner cathode insert, and an intermediate cathode insert in the plasma outflow portion of the cathode tube, and
wherein the at least one plasma emission channel comprises an outer channel and an inner channel, the outer channel being defined between an inner surface of the cathode tube and an outer surface of the intermediate cathode insert, and the inner channel being defined between an inner surface of the intermediate cathode insert and an outer surface of the inner cathode insert.

6. The cathode emitter assembly of claim 1, wherein the at least one cathode insert comprises an outer cathode insert, an inner cathode insert, and first, second, and innermost intermediate cathode inserts in the plasma outflow portion of the cathode tube, and
wherein the at least one plasma emission channel comprises a plurality of annular plasma emission channels, and
wherein an outermost plasma emission channel is defined between an inner surface of the outer cathode insert and an outer surface of the first intermediate cathode insert, an intermediate plasma emission channel is defined between opposing surfaces of the first and second intermediate cathode inserts, and an innermost plasma emission channel is defined between an inner surface of the innermost intermediate cathode insert and an outer surface of the inner cathode insert.

7. The cathode emitter assembly of claim 1, wherein the at least one cathode insert comprises an inner cathode insert and an outer cathode insert, and wherein radii of the inner cathode insert and the outer cathode insert are sized from an existing cathode with a conventional tubular emitter using a method of equal pressure drop across a length of the inner cathode insert and the outer cathode insert as compared to the conventional tubular emitter.

8. The cathode emitter assembly of claim 1, wherein the at least one cathode insert comprises an outer cathode insert and an inner cathode insert, and wherein the outer cathode insert and the inner cathode insert are physically connected, and are configured to permit gas to flow through one or more regions between the outer cathode insert and the inner cathode insert.

9. The cathode emitter assembly of claim 1, wherein the at least one cathode insert comprises an outer cathode insert and an inner cathode insert, and wherein the the outer and inner cathode inserts comprise a monolithic structure, and are configured to permit gas to flow through one or more regions between the outer and inner cathode inserts.

10. The cathode emitter assembly of claim 1, further comprising a sheathed heater positioned about the at least one plasma emission channel.

11. The cathode emitter assembly of claim 1, wherein the at least one plasma emission channel has a uniform size along a length thereof.

12. A method of generating plasma in a cathode emitter assembly including: a cathode tube having a gas feed portion configured to receive a gas and a plasma outflow portion configured to discharge plasma, at least one cathode insert in the plasma outflow portion of the cathode tube, and at least one plasma emission channel extending about the at least one cathode insert within the cathode tube, the method comprising:
feeding gas into the gas feed portion of the cathode tube;
emitting an electric current from the cathode tube;
generating plasma within the at least one plasma emission channel; and
discharging the plasma from the at least one plasma emission channel.

13. The method of claim 12, wherein the at least one cathode insert comprises concentric cathode inserts, and the at least one plasma emission channel comprises a plurality of plasma emission channels defined between the concentric cathode inserts.

14. The method of claim 12, wherein the gas is fed at a fixed gas flow rate.

15. The method of claim 12, wherein the at least one cathode insert comprises a non-emitting material.

16. The method of claim 12, wherein the at least one cathode insert comprises an emissive material.

17. The method of claim 16, wherein the emissive material is selected from the group consisting of lanthanum, hexaboride, barium oxide impregnated tungsten, and carbon nanotubes.

18. The method of claim 12, wherein the at least one cathode insert comprises an outer cathode insert, a first inner cathode insert, and a second inner cathode insert in the outflow section of the cathode tube, and the at least one plasma emission channel is defined between an inner surface of the outer cathode insert and respective outer surfaces of the first and the second inner cathode inserts.

19. The method of claim 12, wherein the at least one plasma emission channel is defined between an inner surface of a first outer cathode insert and respective outer surfaces of first and second inner cathode inserts.

20. The method of claim 12, wherein the at least one plasma emission channel has a uniform size along a length thereof.

* * * * *